US008045615B2

(12) United States Patent
Liang et al.

(10) Patent No.: US 8,045,615 B2
(45) Date of Patent: Oct. 25, 2011

(54) DEBLOCK FILTERING TECHNIQUES FOR VIDEO CODING ACCORDING TO MULTIPLE VIDEO STANDARDS

(75) Inventors: Yi Liang, San Diego, CA (US); Sharath Manjunath, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1597 days.

(21) Appl. No.: 11/136,980

(22) Filed: May 25, 2005

(65) Prior Publication Data

US 2006/0268985 A1    Nov. 30, 2006

(51) Int. Cl.
*H04B 1/66* (2006.01)
(52) U.S. Cl. ......... 375/240.03; 375/240.29; 375/240.26; 375/240.25; 375/240.12; 375/240.13; 375/240.05; 382/238; 382/235; 382/260; 382/233; 382/251; 382/236
(58) Field of Classification Search .............. 375/240.03, 375/240.26, 240.25, 240.12, 240.13, 240.05, 375/240.29; 382/233, 235, 238, 251, 236, 382/260
See application file for complete search history.

(56) References Cited

U.S. PATENT DOCUMENTS

| | | | | |
|---|---|---|---|---|
| 5,867,484 | A * | 2/1999 | Shaunfield | 370/395.51 |
| 7,352,812 | B2 * | 4/2008 | Sun et al. | 375/240.16 |
| 7,397,854 | B2 * | 7/2008 | Kwon et al. | 375/240.03 |
| 7,613,240 | B2 * | 11/2009 | Sun et al. | 375/240.16 |
| 2004/0057521 | A1 * | 3/2004 | Brown et al. | 375/240.25 |

FOREIGN PATENT DOCUMENTS

| | | |
|---|---|---|
| JP | 1114176 | 5/1989 |
| JP | 0403593 | 1/1992 |
| JP | 6274616 | 9/1999 |
| JP | 2005130352 | 5/2005 |

OTHER PUBLICATIONS

Xiaoyan, Sun, et al: "In Loop Deblocking Filter For Block Video coding" Signal Processing, 2002 6th International Conference on Aug. 26-30, 2002, Piscataway, NJ, USA, IEEE, vol. 1, Aug. 26, 2002, pp. 33-36.
Rusert, T., et al: "Enhanced Interframe Wavelet Video Coding Considering The Interrelation of Spatio-Temporal Transform and Motion Compensation" Signal Processing. Image Communication, Elsevier Science Publishers. Amsterdam, NL, vol. 19, No. 7, Aug. 2004, pp. 617-635.
Ma, S, et al: "A Study on the Quantization Scheme in H.264/AVC and Its Applications to Rate Control" Lecture Notes in Computer Science, Springer Verlag, Berlin, DE, vol. 5, Nov. 30, 2004, pp. 192-199.
International International Search Report and Written Opinion—PCT/US2006/020642, International Search Authority—European Patent Office—Nov. 14, 2006.

* cited by examiner

*Primary Examiner* — Shawn An
(74) *Attorney, Agent, or Firm* — Kevin T. Cheatham

(57) ABSTRACT

This disclosure describes deblock filtering techniques in which an in-loop deblock filter of a first codec is used as a post deblock filter of a second codec. A number of techniques are also described to facilitate input parameter adjustments and allow for the effective use of the filter with both codecs. The techniques can simplify the architecture of a device that includes multiple codecs operating according to different coding standards. Specifically, the different codecs can use the same deblocking filter regardless of whether the coding standard calls for in-loop filtering or whether post filtering is used. For example, a filter designed as an in-loop deblocking filter for a codec that complies with the ITU-T H.264 coding standard can be used as a post deblocking filter for MPEG-4 video.

28 Claims, 5 Drawing Sheets

FIG. 2

DEBLOCK FILTERING TECHNIQUES FOR VIDEO CODING ACCORDING TO MULTIPLE VIDEO STANDARDS

TECHNICAL FIELD

This disclosure relates to digital video processing and, more particularly, filtering techniques to reduce blockiness artifacts between adjacent video blocks.

BACKGROUND

Digital video capabilities can be incorporated into a wide range of devices, including digital televisions, digital direct broadcast systems, wireless communication devices, personal digital assistants (PDAs), laptop computers, desktop computers, digital cameras, digital recording devices, cellular or satellite radio telephones, and the like. Digital video devices can provide significant improvements over conventional analog video systems in creating, modifying, transmitting, storing, recording and playing full motion video sequences.

A number of different video coding standards have been established for coding digital video sequences. The Moving Picture Experts Group (MPEG), for example, has developed a number of standards including MPEG-1, MPEG-2 and MPEG-4. Other standards include the International Telecommunication Union Telecommunications (ITU-T) H.263 standard, QuickTime™ technology developed by Apple Computer of Cupertino Calif., Video for Windows™ developed by Microsoft Corporation of Redmond, Wash., Indeo™ developed by Intel Corporation, RealVideo™ from RealNetworks, Inc. of Seattle, Wash., and Cinepak™ developed by SuperMac, Inc. Furthermore, new standards continue to emerge and evolve, including the ITU-T H.264 standard and a number of proprietary standards.

Many video coding standards allow for improved transmission rates of video sequences by coding data in a compressed fashion. Compression can reduce the overall amount of data that needs to be transmitted for effective transmission of video frames. Most video coding standards, for example, utilize graphics and video compression techniques designed to facilitate video and image transmission over a narrower bandwidth.

The MPEG standards and the ITU-T H.263 and ITU-T H.264 standards, for example, support video coding techniques that utilize similarities between successive video frames, referred to as temporal or inter-frame correlation, to provide inter-frame compression. The inter-frame compression techniques exploit data redundancy across frames by converting pixel-based representations of video frames to motion representations. In addition, some video coding techniques may utilize similarities within frames, referred to as spatial or intra-frame correlation, to further compress the video frames. The video frames are often divided into smaller video blocks, and the inter-frame or intra-frame correlation is applied at the video block level.

In order to achieve video frame compression, a digital video device typically includes an encoder for compressing digital video sequences, and a decoder for decompressing the digital video sequences. In many cases, the encoder and decoder form an integrated "codec" that operates on blocks of pixels within frames that define the video sequence. As used in this disclosure, the term "codec" refers to an encoder, a decoder or an integrated encoder/decoder.

In the MPEG-4 standard, the codec typically divides a video frame to be transmitted into video blocks referred to as "macroblocks." The ITU-T H.264 standard supports 16 by 16 video blocks, 16 by 8 video blocks, 8 by 16 video blocks, 8 by 8 video blocks, 8 by 4 video blocks, 4 by 8 video blocks and 4 by 4 video blocks. Other standards may support differently sized video blocks. For each video block in the video frame, an codec searches similarly sized video blocks of one or more immediately preceding video frames (or subsequent frames) to identify the most similar video block, referred to as the "best prediction." The process of comparing a current video block to video blocks of other frames is generally referred to as motion estimation. Once a "best prediction" is identified for a current video block during motion estimation, the codec can code the differences between the current video block and the best prediction.

This process of coding the differences between the current video block and the best prediction includes a process referred to as motion compensation. Motion compensation comprises a process of creating a difference block indicative of the differences between the current video block to be coded and the best prediction. In particular, motion compensation usually refers to the act of fetching the best prediction block using a motion vector, and then subtracting the best prediction from an input block to generate a difference block. The difference block typically includes substantially less data than the original video block represented by the difference block.

After motion compensation has created the difference block, a series of additional steps can also be performed to further code the difference block and further compress the data. These additional steps may depend on the coding standard being used. In MPEG-4 compliant codecs, for example, the additional steps may include an 8×8 discrete cosine transform, followed by scalar quantization, followed by a raster-to-zigzag reordering, followed by run-length encoding, followed by Huffman encoding. A coded difference block can be transmitted with a motion vector that indicates which video block from the previous frame (or subsequent frame) was used for the coding. A codec of a receive device receives the motion vector and the coded difference block, and decodes the received information to reconstruct the video sequences.

The use of discrete video blocks in inter-frame and/or intra-frame compression can cause artifacts in the video sequence between adjacent video blocks. In particular, when a video frame is divided into video blocks for video coding, the edge of one video block may appear discontinuous with the adjacent edge of another video block. When this occurs, the video frame may appear "blocky," which is highly undesirable. Transforms and quantization of video blocks can compound this undesirable blockiness effect in coded video frames.

In order to remove such "blockiness," filtering can be performed on the video blocks to "smooth" the transitions between adjacent video blocks. Deblocking filters generally refer to the filters that are used to smooth the transitions between adjacent video blocks to reduce or eliminate blockiness artifacts. The ITU-T H.264 standard, for example, requires a deblocking filter as part of the in-loop coding. In this case, when filtering is part of the in-loop video coding, the previously coded frames used in motion estimation and motion compensation are filtered versions of such frames. For other standards that do not mandate a deblocking filter as part of the coding loop, post deblock filtering may still improve the quality of the video coding.

SUMMARY

This disclosure describes deblock filtering techniques in which an in-loop deblock filter of a first codec is used as a post deblock filter of a second codec. A number of techniques are also described to facilitate input parameter adjustments and allow for the effective use of the filter with both codecs. The techniques can simplify the architecture of a device that includes multiple codecs operating according to different coding standards. Specifically, with different coding formats, the same deblocking filter can be used regardless of whether the coding standard calls for in-loop filtering or whether post filtering is used. For example, a filter designed as an in-loop deblocking filter for a codec that complies with the ITU-T H.264 coding standard can be used as a post deblocking filter for MPEG-4.

In one embodiment, this disclosure provides a method comprising applying an in-loop deblocking filter of a first video coder compliant with a first video coding standard that specifies deblock filtering as part of a prediction loop of the first coding standard that includes motion estimation and motion compensation as a post deblocking filter of a second video coder compliant with a second video coding standard that does not specify deblock filtering as part of a prediction loop of the second coding standard.

In another embodiment, this disclosure provides a video coding device comprising a first codec that codes first video sequences according to a first video coding standard using prediction-based coding techniques on first video blocks associated with the first video sequence; a deblocking filter used by the first codec as an in-loop filter to smooth transitions between adjacent video blocks in the first video sequence; and a second codec that codes second video sequences according to a second video coding standard using prediction-based coding techniques on second video blocks associated with the second video sequence, wherein the second codec uses the deblocking filter as a post filter to smooth transitions between adjacent video blocks associated with the second video sequence.

These and other techniques described herein may be implemented in a digital video device in hardware, software, firmware, or any combination thereof. If implemented in software, the software may be executed in a digital signal processor (DSP). In that case, the software that executes the techniques may be initially stored in a computer readable medium and loaded and executed in the DSP for effective deblock filtering in a digital video device.

Additional details of various embodiments are set forth in the accompanying drawings and the description below. Other features, objects and advantages will become apparent from the description and drawings, and from the claims.

BRIEF DESCRIPTION OF DRAWINGS

FIG. 2 is an illustration of two adjacent video blocks to demonstrate the concept of deblock filtering.

DETAILED DESCRIPTION

Figure 1:
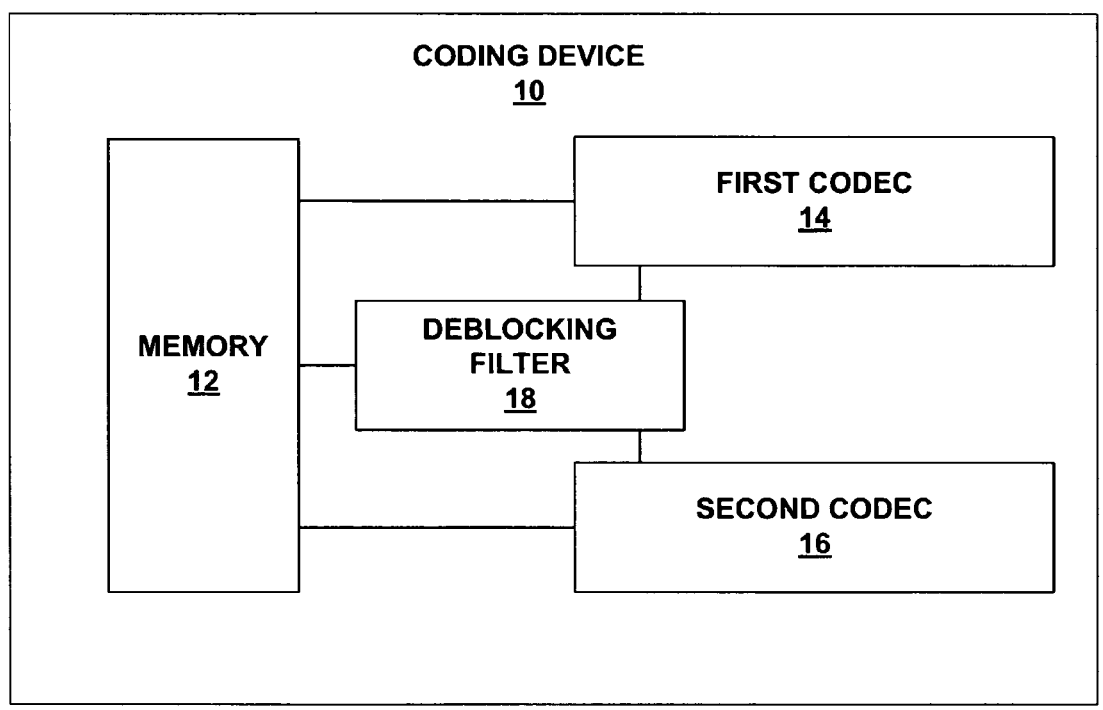
FIG. 1 is an exemplary block diagram of a coding device that includes a plurality of codecs that share a deblocking filter according to an embodiment of this disclosure.

This disclosure describes deblock filtering techniques in which an in-loop deblock filter of a first codec is used as a post deblock filter of a second codec. The phrase deblock filtering generally refers to filtering techniques that can reduce or eliminate "blockiness" artifacts that manifest in any video coding that makes use of correlation techniques, such as inter-frame correlation or intra-frame correlation. When prediction-based coding techniques are used, the video coding is performed with respect to discrete video blocks of a video frame and the video blocks are correlated with other video blocks in order to achieve compression.

In intra-frame coding, a current video block to be coded is compared to one or more other video blocks of the same video frame, and video compression can be achieved by exploring the correlation between the current video block and the one or more video blocks to which the current video block is compared. In inter-frame coding, the video blocks of a frame are compared to one or more video blocks of a different frame of the video sequence, and video compression can be achieved by exploring the correlation between a current video block to be coded and a video block of the different frame (e.g., a previous or subsequent frame of the sequence) that closely matches the current video block. Inter-frame coding may involve processes referred to as motion estimation and motion compensation.

Deblocking filters refer to the filters that are used to smooth the transitions between adjacent video blocks in order to reduce or eliminate blockiness artifacts. The ITU-T H.264 standard, for example, requires a deblocking filter as part of the in-loop coding. In this case, when filtering is part of the in-loop video coding, the previously coded frames used in the motion estimation and motion compensation are filtered versions of such frames. In other words, "in-loop" deblock filtering refers to deblock filtering that forms part of the coding loop such that any subsequent coding uses the filtered video blocks or frames during the prediction between a current video block to be coded and the previous video blocks.

Some standards, however, do not mandate deblock filtering as part of the in-loop coding. For example, normative MPEG-4 (referred to herein as MPEG-4) does not require any deblock filtering to comply with the standard. For MPEG-4 or other standards that do not mandate a deblocking filter as part of the coding loop, post deblock filtering may still improve the quality of the decoded video. In such cases, deblock filtering can be applied after the in-loop coding to remove blockiness artifacts between video blocks. In general, post filtering may be applied after decoding, and does not form part of the coding loop. Thus, any subsequent coding uses the un-filtered video blocks or frames during the correlation comparisons between a current video block to be coded and the previous video blocks.

In accordance with this disclosure, techniques are described in which an in-loop deblock filter of a first codec is used as a post deblock filter of a second codec. A number of techniques are also described to facilitate input parameter adjustments and allow for the effective use of the filter with both codecs. For example, if the filter is designed to receive certain input under a first coding standard, the input under a second coding standard my need to be adjusted in order to allow the same filter to be used for the second coding standard.

Generally, the techniques can simplify the architecture of a video coding device that includes multiple codecs operating according to different coding standards. Specifically, the different codecs can use the same deblocking filter regardless of whether the coding standard calls for in-loop filtering or whether post filtering is used. The techniques may be particularly desirable for small hand-held devices that include video capabilities, such as satellite or terrestrial radio-telephones, or any device where hardware reductions are desirable. The techniques may be used with any video coding standards that explore content correlation, including inter-frame correlation or intra-frame correlation.

FIG. 1 is a block diagram of a coding device 10 according to this disclosure. Coding device 10 may comprise any of a wide variety of devices that can be used to encode or decode video sequences. Examples of coding device 10 generally include any computer such as a server, a workstation or any other desktop computing device, or a mobile computing device such as a laptop computer or a personal digital assistants (PDAs). Other examples include digital television broadcasting satellites and receiving devices such as digital televisions, digital cameras, digital video cameras or other digital recording devices. Still other examples include digital video telephones such as mobile telephones having video capabilities, direct two-way communication devices with video capabilities, other wireless video devices, and the like. The techniques may be particularly useful for small handheld devices in which size and battery consumption are more relevant.

Coding device 10 includes a memory 12, which may comprise any volatile or non-volatile storage elements. In some cases, memory 12 may include both on-chip and off-chip memory. For example, memory 12 may include a relatively large off-chip memory space that stores a video sequence, and a smaller and faster local on-chip memory used in the coding process. In that case, the off-chip memory may comprise dynamic random access memory (DRAM), or FLASH memory, and a local on-chip memory may comprise synchronous random access memory (SRAM). For simplicity, however, a single memory 12 is illustrated to represent any number of memory elements that can be used to facilitate video coding.

Coding device 10 includes a plurality of codecs that code video sequences according to different standards, respectively. For example, coding device 10 includes a first codec 14 that codes video sequences according to a first video coding standard, and a second codec 16 that codes video sequences according to a second video coding standard. The codec used by coding device 10 may be selectable by a user, dynamically selected by device 10 based on the sequence to be coded, or programmed by a manufacturer or distributor of coding device 10.

In accordance with this disclosure, first and second codecs 14 and 16 share a deblocking filter 18. Thus, deblocking filter 18 may be viewed as an integral component of either of codecs 14 or 16, or may be viewed as a separate component. In any case, deblocking filter 18 performs deblock filtering for both of codecs 14 and 16.

Codec 14 may code video sequences in compliance with a first coding standard that specifies in-loop deblock filtering. Thus, with respect to codec 14, deblocking filter 18 operates as part of the coding or prediction loop. Codec 16, in contrast, may code video sequences in compliance with a second coding standard that does not specify in-loop deblock filtering. Therefore, with respect to codec 16, deblock filter 18 operates as a post filter that is not part of the coding loop. The input to the filter may be modified in order to accommodate post filtering for the second coding standard using a filter designed for in-loop filtering for the first coding standard.

Each of codecs 14 and 16 may comprise an encoder, a decoder, or an integrated encoder/decoder. In any case, codecs 14 and 16 may be implemented collectively or separately within hardware, software, firmware, one or more digital signal processors (DSPs), microprocessors, application specific integrated circuits (ASICs), field programmable gate arrays (FPGAs), discrete hardware components, or various combinations thereof. By way of example, deblocking filter 18 may comprise a hardware-implemented filter that receives input from either of codecs 14, 16. However, a software-implemented filter or firmware-implemented filter may also be used according to the techniques described herein.

Each of codecs 14 and 16 perform prediction-based coding techniques in order to compress video sequences. The prediction-based coding techniques may be inter-frame-based techniques or intra-frame based, or possibly both. Codecs 14, 16 operate on blocks of pixels (or other video block coefficients, such as DCT coefficients) within a sequence of video frames in order to code the video data. For example, codecs 14 and 16 may execute motion estimation and motion compensation techniques in which a video frame to be transmitted is divided into blocks of pixels or DCT coefficients (both cases referred to as video blocks). The video blocks, for purposes of illustration, may comprise any size of blocks, and may vary within a given video sequence.

As an example, the ITU-T H.264 standard supports 16 by 16 video blocks, 16 by 8 video blocks, 8 by 16 video blocks, 8 by 8 video blocks, 8 by 4 video blocks, 4 by 8 video blocks and 4 by 4 video blocks. The MPEG-4 standard supports 16 by 16 video blocks of pixels (sometimes referred to as "macroblocks"), and the macroblocks are divided into 8 by 8 video blocks of DCT coefficients following a DCT transform consistent with the MPEG-4 standard. In general, the use of smaller video blocks in the video coding can produce better resolution in the coding, and may be specifically used for locations of a video frame that include higher levels of detail.

Each pixel in a video block may be represented by various n-bit values, e.g., 8 bits, that define visual characteristics of the pixel such as the color and intensity in values of chromaticity and luminosity. Each pixel may have one or more 8-bit values for both chromaticity and luminosity. The principles of this disclosure, however, are not limited to the format of the pixels, and may be extended for use with simpler fewer-bit pixel formats or more complex larger-bit pixel formats. The pixels may also be defined in accordance with other color coordinate systems. Also, video blocks may be represented by DCT coefficients, or other coefficients or variables, depending on the video coding standard being supported.

Again, deblocking filter 18 is used by first codec 14 and second codec 16, thereby eliminating the need for separate filters for each codec. However, with respect to first codec 14, deblocking filter 18 is implemented as an in-loop filter, whereas with respect to second codec 16, deblocking filter 18 is implemented as a post filter. When used as a post filter, the filtering may be applied on the encoder side for display purpose, but is more typically applied following decode of the video sequence. In any case, in order to support such dual filtering functionality, the input parameters to the filter (such as a quantization parameter (QP)) may need to be mapped from one standard to another. Codecs 14 and 16 may each include filtering units that perform any necessary mapping or adjustments to the filter input prior to invoking deblocking filter 18. Additional details of such adjustments (including an example of QP mapping from MPEG-4 to ITU-T H.264) are described in greater detail below.

Device 10 may include several other components, such as a transmitter to transmit the coded sequences to another device, and possibly a video capture device, such as a video camera, to capture video sequences and store the captured sequences in memory 12. Numerous other elements, such as intra-frame coder elements, additional coders, various other filters, or other elements may also be included in device 12, but are not specifically illustrated for simplicity.

Figure 2:
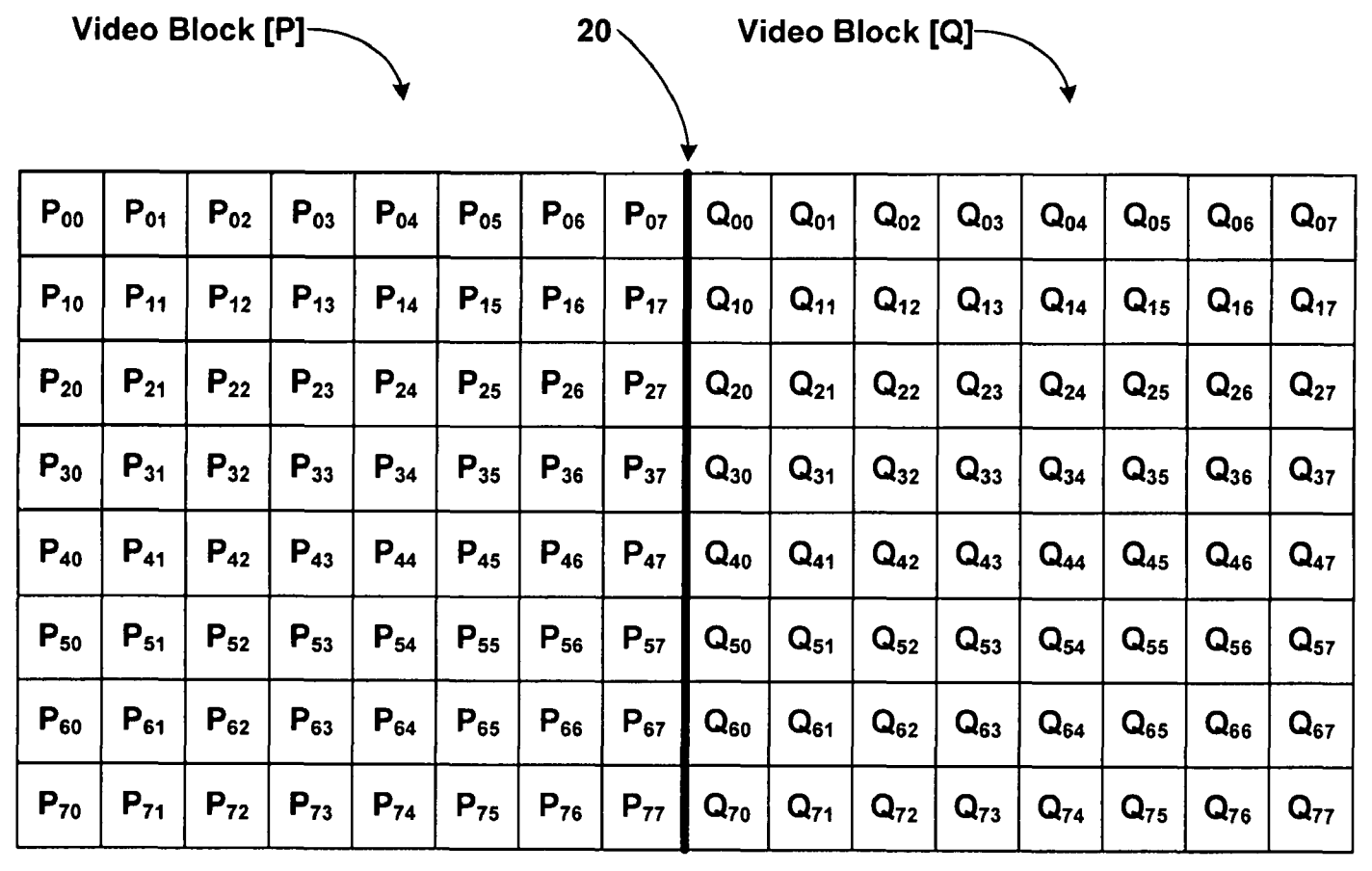

FIG. 2 is an illustration of two adjacent video blocks to demonstrate the concept of deblock filtering. As shown in FIG. 2, video block [P] is and 8 by 8 element decoded video block positioned immediately adjacent video block [Q], which is also an 8 by 8 element decoded video block. Each different element of video blocks [P] and [Q] are labeled with sub-scripts. The different elements comprise pixel values to represent a video block. Each element may also represent both chromaticity and luminosity values. Blocks P and Q are decoded video blocks, which have reconstructed pixel values.

Due to prediction-based video coding and quantization, the respective pixel values of video blocks [P] and [Q] may be discontinuous where the edges of video blocks [P] and [Q] meet. In other words, the value of elements $P_{07}$-$P_{77}$ in the eighth row of elements may be sufficiently different than the values of elements $Q_{00}$-$Q_{70}$ such that blockiness artifacts appear along the junction 20 of these rows. Similar problems can manifest along any side of a video block and may manifest not only in the immediately adjacent elements of blocks [P] and [Q] but also other rows of elements of blocks [P] and [Q] close to junction 20. Quantization and transformations of video blocks, such as DCT transforms, can compound the undesirable blockiness effects in coded video frames.

Deblock filtering can smooth the junction 20 by adjusting the values of adjacent elements of different video blocks. For example, if the values of elements $P_{07}$-$P_{77}$ are sufficiently higher than the values of elements $Q_{00}$-$Q_{70}$, deblock filtering may reduce the values of $P_{07}$-$P_{77}$, increase the values of elements $Q_{00}$-$Q_{70}$, or both, in order to visually smooth junction 20. Other elements close to junction 20 may also be filtered. However, in some cases, a scene change may be present along junction 20, in which case, deblock filtering may need to be avoided. Typically, deblock filtering is applied if the values of elements along junction 20 are modestly different, indicating that they should be more continuous, but not too different, indicating a possible scene change along junction 20. A filtering decision determines whether the filtering is to be avoided based on a probably scene change at junction 20.

Again, the techniques described herein facilitate post deblock filtering using a deblock filter originally designed for in-loop deblock filtering. In this manner, the same deblocking filter may be used by two different codecs that operate according to different video coding standards, one of which mandates in-loop deblock filtering and the other for which post deblock filtering is not mandatory but can improve the visual appearance of the coding.

Figure 3:
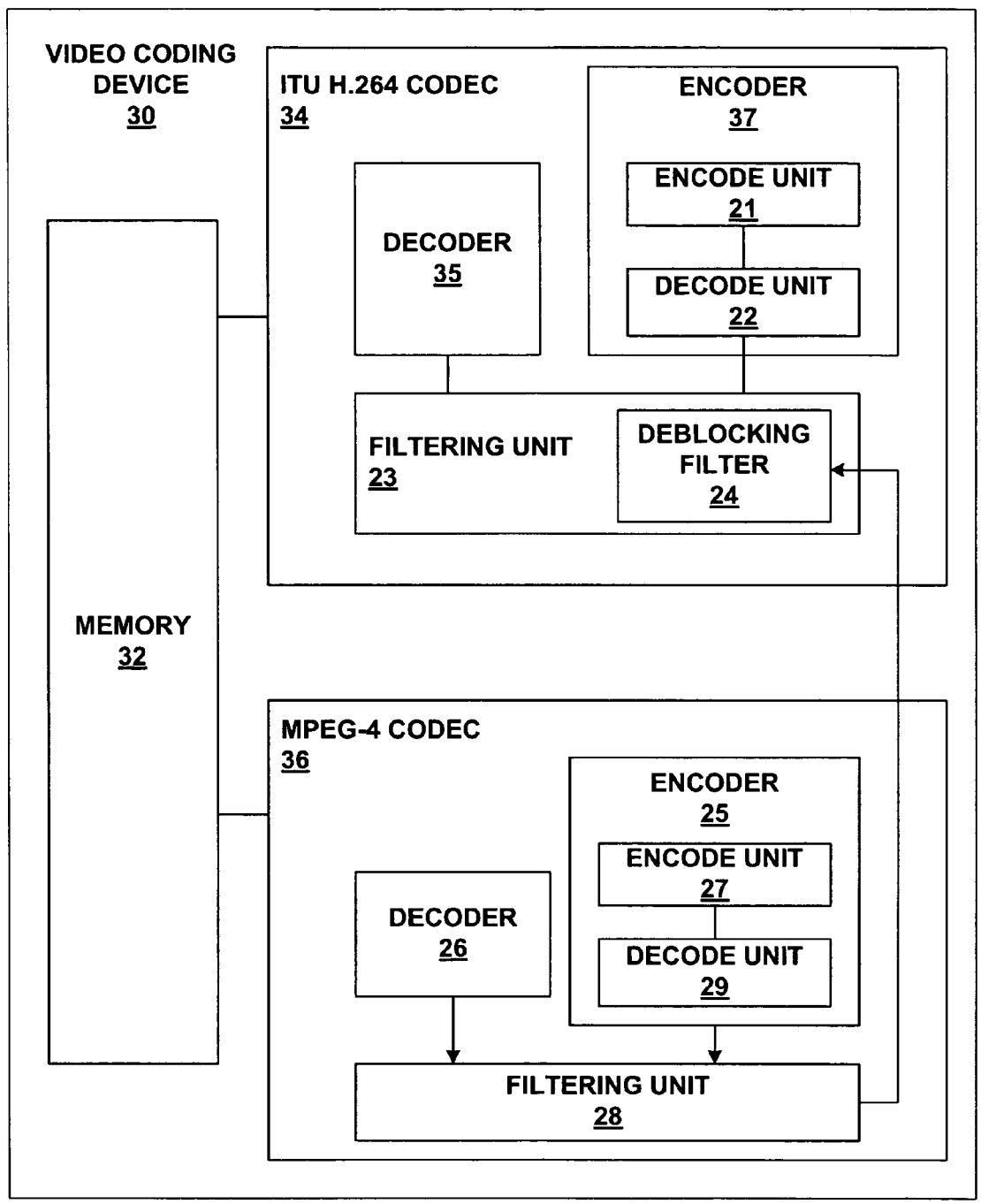
FIG. 3 is block diagram of a coding device that includes an ITU-T H.264 codec and an MPEG-4 codec that that share a deblocking filter according to an embodiment of this disclosure.

FIG. 3 a block diagram of a coding device 30 that includes a plurality of codecs that share a deblocking filter according to this disclosure. Coding device 30 may be one specific implementation of coding device 10 of FIG. 1. As shown in FIG. 3, video coding device 30 includes a memory 32 that stores a video sequence to be coded, an ITU-T H.264 codec 34 coupled to memory 32 and an MPEG-4 codec 36 coupled to memory 32.

ITU-T H.264 codec 34 codes video sequences in compliance with the ITU-T H.264 standard. ITU-T H.264 codec 34 includes an encoder 37 and a decoder 35. While the actual implementation of encoder 37 and decoder 35 may share hardware, these components are illustrated separately. Encoder 37 may perform motion estimation and motion compensation. Encoder 37 includes an encode unit 21 to perform such prediction based coding, but also includes a decode unit 22, which is used to reconstruct the coded video frames that are to be used for future prediction. Decode unit 22 and decoder 35 may comprise many common components, but are shown separately for illustrative purposes. Many other components may also be included, but are not illustrated for simplicity. Filtering unit 23 include a deblocking filter 24 that forms part of the coding loop of encoder 37, consistent with ITU-T H.264 standard compliance. Decoder 35 also uses deblocking filter 24 for decoding in compliance with the ITU-T H.264 standard.

Memory 32 stores a video frame to be coded along with a search space, which may comprise a subset of video blocks of one or more of the preceding video frames (or subsequent frames). The chosen subset may be pre-identified as a likely location for identification of a best prediction that closely matches the current video block to be coded. Moreover, the search space may change over the course of motion estimation and may become progressively smaller in terms of the size of the search space, with later searches being performed at greater resolution than previous searches.

Encode unit 21 compares the current video block to be coded to various video blocks in the search space in order to identify a best prediction. In some cases, however, an adequate match for the coding may be identified more quickly, without specifically checking every possible candidate, and in that case, the adequate match may not actually be the "best" prediction, albeit adequate for effective video coding. In general, the phrase "prediction video block" refers to an adequate match, which may be the best prediction.

Encode unit 21 performs the comparisons between the current video block to be coded and the candidate video blocks in the search space of memory 32. In some cases, candidate video blocks may include non-integer pixel values generated for fractional interpolation. By way of example, encode unit 21 may perform sum of absolute difference (SAD) techniques, sum of squared difference (SSD) techniques, or other comparison techniques, in order to define the difference value for the candidate video block. A lower difference value generally indicates that a candidate video block is a better match, and thus a better candidate for use in motion estimation coding than other candidate video blocks yielding higher difference values.

Ultimately, encode unit 21 identifies a prediction video block, which is the candidate video block that will be used to code the current video block. Once a prediction video block is identified by motion estimator 21, motion compensator 22 creates a difference block indicative of the differences between the current video block and the prediction video block. The difference block may be further compressed, if desired.

In order to reduce blockiness artifacts, the ITU-T H.264 standard mandates the use of a deblocking filter 24 as part of the coding loop. Consistent with the ITU-T H.264 standard, filtering unit 23 applies deblocking filter 24 to video blocks. Decode unit 22 reconstructs encoded frames to facilitate the coding of subsequence blocks. The reconstruction of encoded frames also allows the in-loop deblock filtering to be applied. The deblock filtering may be based on a quantization parameter selected for the video coding, a boundary strength as determined by the ITU-T H.264 standard and a filtering decision.

The quantization parameter (QP) is a parameter that defines the level of quantization used in the coding, and is typically defined based on a desired coding rate or a desired bandwidth that needs to be met by the compression. The boundary strength is a parameter having a value between 0 and 4 inclusive. A boundary strength of 0 results in no filtering and a boundary strength of 4 results in the strongest filtering.

Boundary strengths of 1, 2 and 3 define increasing levels of filtering, respectively. The ITU-T H.264 standard sets forth various criteria for determining the boundary strength of video block edges.

The filtering decision is generally a decision whether to filter or not, based on thresholds that account for the fact that scene change may be present. The filtering decision may examine values of the video block elements (e.g., pixel values or DCT coefficients) and compare various differences between the elements of adjacent video blocks to various thresholds. If a difference is less than a threshold, then the filtering decision allows filtering and assumes that continuous imagery is desirable at the block boundary. However, if a difference is greater than a threshold, then the filtering decision may prevent filtering and assume that the imagery represents a scene change at the block boundary that should not be filtered. The ITU-T H.264 standard and other related ITU-T H.264 documentation set forth mathematics to guide the boundary strength calculation and filtering decision determinations.

ITU-T H.264 codec 34 also includes a decoder 35 in compliance with the ITU-T H.264 standard. Decoder 35 also accesses deblocking filter 24 in order to perform the decoding according to ITU-T H.264. Importantly, the deblock filtering by codec 34 is applied as part of the coding loop as required by the ITU-T H.264 standard.

MPEG-4 codec 36 codes video sequences in compliance with the MPEG-4 video coding standard. MPEG-4 codec 36 includes an encoder 25, a decoder 26, and a filtering unit 28. The actual implementation of encoder 25 and decoder 26 may share hardware, but these components are illustrated separately. Many other components may also be included, but are not illustrated for simplicity. In accordance with this disclosure, filtering unit 28 accesses deblocking filter 24 of ITU-T H.264 codec 34 and uses deblocking filter 24 as a post filter. When deblocking filter 24 is used as a post filter, it does not form part of the coding loop. Such post filtering may be performed at the encoder side for display purpose, but is more typically applied after decoding has occurred.

Similar to ITU-T H.264 codec 34, encoder 25 of MPEG-4 codec 36 performs inter-frame coding using a motion estimation and motion compensation. Memory 32 stores a video frame to be coded along with a search space. Encode unit 27 compares the current video block to be coded to various video blocks in the search space in order to identify a prediction video block, e.g., using SAD techniques, SSD techniques, or the like, in order to quantify the similarities between candidate video blocks and the current video block to be coded. Once a prediction video block is identified encode unit 27 creates a difference block indicative of the differences between the current video block and the prediction video block. DCT transform is also performed, which can introduce or compound blockiness artifacts. Decode unit 22 reconstructs encoded frames to facilitate the predictive coding of subsequent video blocks and frames.

MPEG-4 codec 36 also includes a decoder 26 in compliance with the MPEG-4 standard. Decoder 26 also accesses deblocking filter 24, via filtering unit 28, in order to apply post filtering during the decoding in compliance with MPEG-4. Importantly, with respect to MPEG-4 codec 36 the deblock filtering does not form part of the coding loop, but is applied as a post filtering improvement to a decoded video frame.

The MPEG-4 standard does not require deblock filtering as part of the coding loop. However, post filtering can be applied without jeopardizing compliance with MPEG-4, e.g., as set forth in the postprocessing part of the informative Annex F of the MPEG-4 standards documentation. In order to support such post filtering, MPEG-4 codec 36 includes filtering unit 28. Filtering unit 28 as described in this disclosure, however, does not itself include a filter. Instead, filtering unit 28 accesses the in-loop deblocking filter 24 of ITU-T H.264 codec 34 and uses filter 24 as a post deblocking filter for MPEG-4. In this manner, the need for two separate filters is avoided.

Filtering unit 28 performs any input parameter adjustments needed to effectively use deblocking filter 24. The filtering may be based on a quantization parameter selected for the video coding, a boundary strength, and a filtering decision. The generation of these parameters, however, may require mapping or adjustment from MPEG-4 to ITU-T H.264. With respect to MPEG-4, deblocking filter 24 can be applied on 8 by 8 block edges instead of the different length edges defined in ITU-T H.264 because DCT is typically applied on 8 by 8 wide blocks.

The quantization parameter (QP) is a parameter that defines the level of quantization used in the coding, and is typically defined based on a desired coding rate or a desired band width that needs to be met by the compression. Unfortunately, MPEG-4 and ITU-T H.264 do not have the number of QPs or the same resolution for the QPs. Specifically, the ITU-T H.264 standard allows for more QP resolution and includes many more QPs than MPEG-4, which are used to define the finer resolution.

Because the QP is an input parameter to deblocking filter 24, filtering unit 28 maps the QPs for MPEG-4 to QPs for ITU-T H.264 which can then be used as an input parameter to deblocking filter. Filtering unit 28 may access a look-up table (LUT) stored in memory 32 in order to perform this mapping or may apply an mapping equation. For example, the QP conversion may be performed according to the following Equation 1:

$$QP_{H.264\ FILTER} = \text{round}(6 * \log QP_{MPEG-4}/\log 2 + 20) \quad \text{Equation 1}$$

Table 1, below, is the output mapping of this equation and may be stored as a LUT.

TABLE 1

| QP in MPEG-4 | QP for H.264 deblocking filter |
|---|---|
| 1 | 20 |
| 2 | 26 |
| 3 | 30 |
| 4 | 32 |
| 5 | 34 |
| 6 | 36 |
| 7 | 37 |
| 8 | 38 |
| 9 | 39 |
| 10 | 40 |
| 11 | 41 |
| 12 | 42 |
| 13 | 42 |
| 14 | 43 |
| 15 | 43 |
| 16 | 44 |
| 17 | 45 |
| 18 | 45 |
| 19 | 45 |
| 20 | 46 |
| 21 | 46 |
| 22 | 47 |
| 23 | 47 |
| 24 | 48 |
| 25 | 48 |
| 26 | 48 |
| 27 | 49 |
| 28 | 49 |
| 29 | 49 |

TABLE 1-continued

| QP in MPEG-4 | QP for H.264 deblocking filter |
|---|---|
| 30 | 49 |
| 31 | 50 |

Figure 4:
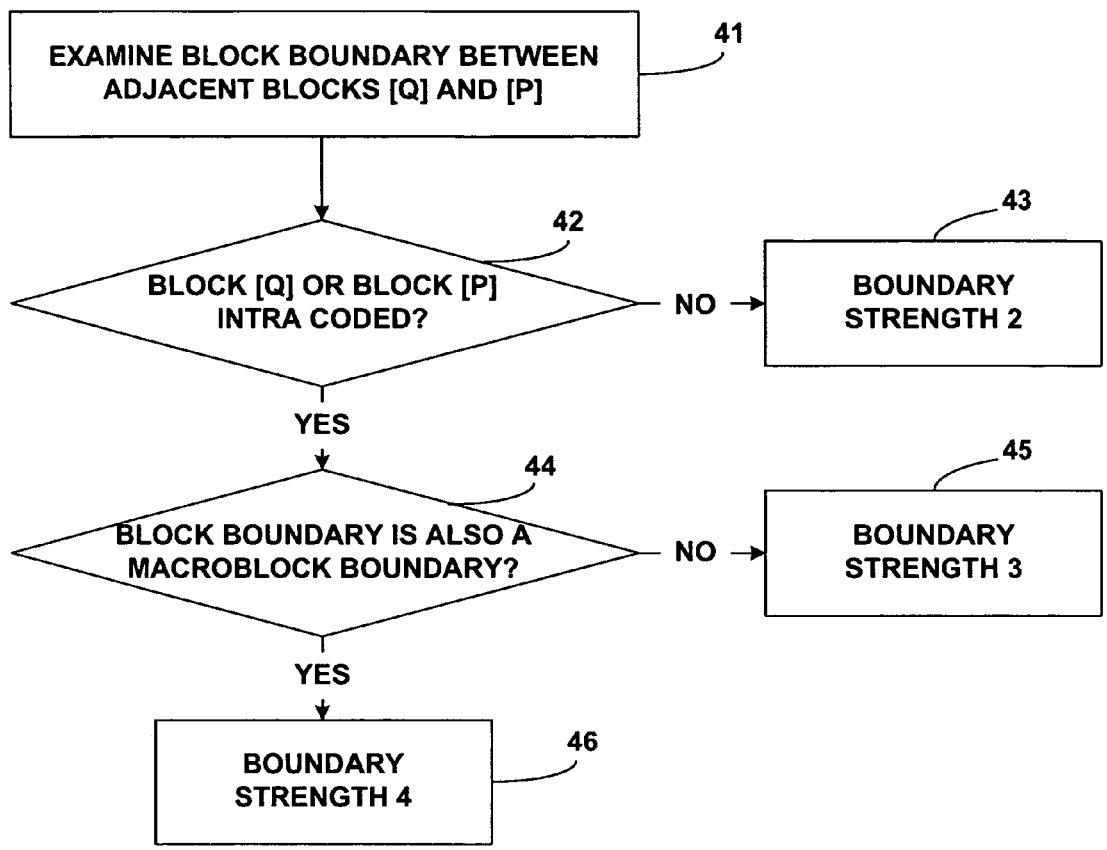
FIG. 4 is a flow diagram illustrating a technique for determining boundary strength of video blocks coded in compliance with MPEG-4 for purposes of deblock filtering with a ITU-T H.264 deblocking filter.

Filtering unit 28 determines boundary strength between two adjacent blocks acceding to the process illustrated in FIG. 4. As shown in FIG. 4, filtering unit 28 examines the block boundary between two adjacent video blocks (41), i.e., video block [P] and video block [Q]. If neither of video blocks [P] or [Q] are intra coded (no branch of 42), a boundary strength of 2 is assigned to the boundary (43). If at least one of video blocks [P] or [Q] are intra coded (yes branch of 42) but the block boundary is not a macroblock boundary (no branch of 44), then a boundary strength of 3 is assigned to the boundary (45). If one or both of video blocks [P] or [Q] are intra coded (yes branch of 42) and the block boundary is a macroblock boundary (yes branch of 44), then a boundary strength of 4 is assigned to the boundary (46). In accordance with the process of FIG. 4, the boundary strengths of 0 and 1 are never assigned to MPEG-4 video block boundaries.

Filtering unit 28 then identifies a filtering decision in accordance with ITU-T H.264 deblock filtering. The filtering decision is generally a decision whether to filter or not, based on thresholds that account for the fact that scene change may be present. According to the ITU-T H.264 standard, the filtering decision examines values of the video block elements and compares various differences between the elements of adjacent video blocks to various thresholds. If the difference is less than a threshold, then the filtering decision allows filtering and assumes that continuous image is desirable at the block boundary. However, if a difference is greater than a threshold, then the filtering decision may prevent filtering and assume that the image represents a scene change at the block boundary that should not be filtered.

Again, the ITU-T H.264 standard sets forth mathematics to guide the filtering decision determinations, and these same mathematics can be used for purposes of MPEG-4 post filtering. Notably, although the same mathematics are used, the mathematics are dependent upon the QP, which is mapped as described above. Thus, although the ITU-T H.264 standard mathematics can be used for purposes of filtering decision determinations in MPEG-4 post filtering, the QP mapping affects such mathematics insofar as the MPEG-4 QP is changed by the mapping techniques described above.

Figure 5:
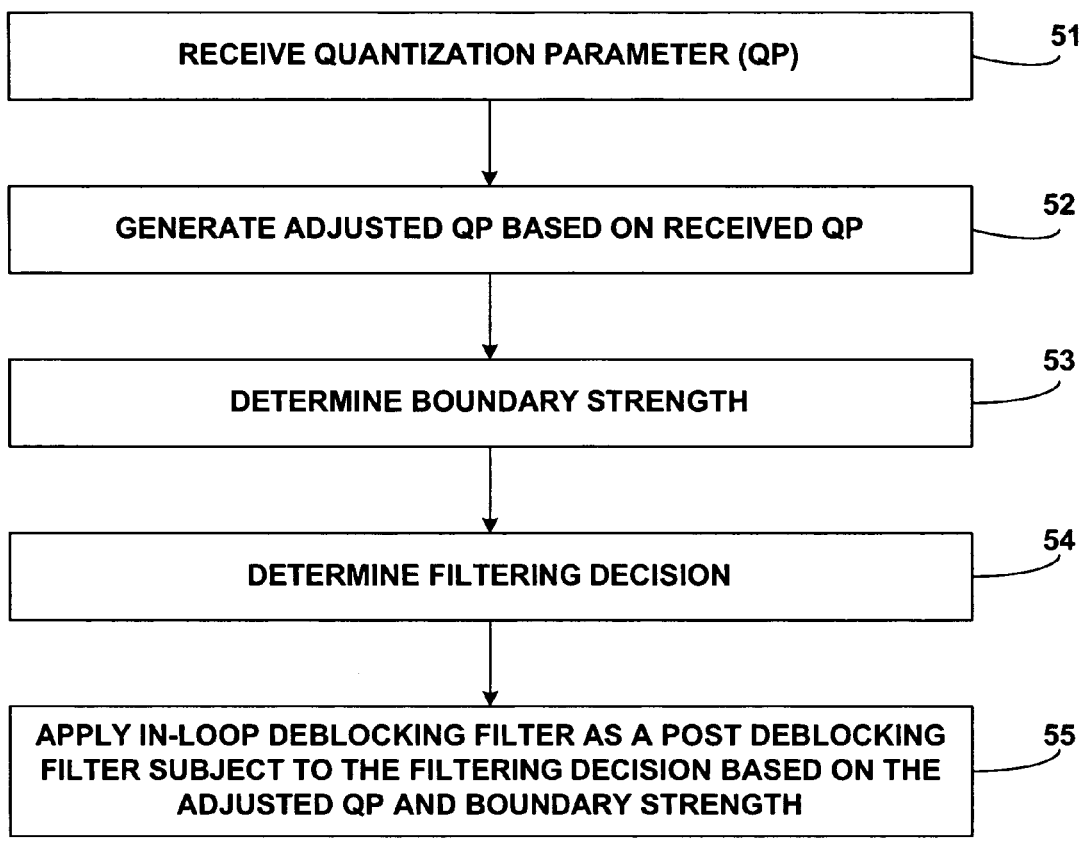
FIG. 5 is a flow diagram illustrating a technique in which an in-loop deblock filter can be used as a post deblock filter.

FIG. 5 is a flow diagram illustrating a technique in which an in-loop deblock filter can be used as a post deblock filter. FIG. 5 will be described with reference to video coding device 30 of FIG. 3. As shown in FIG. 5, filtering unit 28 of MPEG-4 codec 32 receives a quantization parameter (QP) (51), and generates an adjusted QP based on the received QP (52). The received QP may be a QP from MPEG-4 whereas the adjusted QP may be a ITU-T H.264 QP that results in similar resolution. The process of generating the adjusted QP may involve applying an equation similar to Equation 1, listed above, or may involve a table lookup using a table similar to Table 1.

Filtering unit 28 then determines a boundary strength (53), e.g., using a process similar to that of FIG. 4. The boundary strength generally defines the level of filtering to be applied, with higher boundary strengths generally amounting to greater filtering. In addition, filtering unit 28 determines a filtering decision (54), which generally identifies whether or not to perform the filtering because of a possible scene change at the boundary, in which case filtering should be avoided. Filtering unit 28 may apply mathematics according to the ITU-T H.264 standard in determining the filtering decision. However, the mathematics are dependent upon QP and is therefore affected by the QP adjustment performed in step 52.

Filtering unit 28 then applies in-loop deblocking filter 24 of codec 34 subject to the filtering decision (55). In other words, filtering may be avoided if the filtering decision so mandates, e.g., because of a scene change at the block boundary. If the filtering decision allows filtering, deblocking filter 24 is applied based on the adjusted QP and the determined boundary strength (55).

The process of FIG. 5 may be applied with respect to every video block boundary of every video block in a coded sequence. For example, the process may be applied with respect to boundary 20 between adjacent video blocks illustrated in FIG. 2, but also with respect to top and bottom video block boundaries of adjacent video blocks above and below one another. Again, although standards such as MPEG-4 do not mandate deblock filtering, such filtering can improve the quality of the video coding. By using an in-loop deblocking filter of another codec as a post filter, a video coding device that supports multiple coding standards can be simplified by eliminating the need for a separate post deblocking filter.

A number of embodiments have been described. The techniques described herein may be implemented in hardware, software, firmware, or any combination thereof. If implemented in software, the techniques may be directed to a computer readable medium comprising program code, that when executed in a device that codes video sequences, performs one or more of the deblock filtering techniques described herein. In that case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

The program code may be stored on memory in the form of computer readable instructions. In that case, a processor such as a DSP may execute instructions stored in memory in order to carry out one or more of the deblock filtering techniques. In some cases, the techniques may be executed by a DSP that invokes various hardware components to accelerate the coding process. In other cases, the codecs described herein may be implemented as a microprocessor, one or more application specific integrated circuits (ASICs), one or more field programmable gate arrays (FPGAs), or some other hardware-software combination. The deblock filter may comprise a hardware filter, or possibly a filter implemented in software or firmware. These and other embodiments are within the scope of the following claims.

The invention claimed is:

1. A video coding device comprising:
    a first codec that codes first video sequences according to a first video coding standard using prediction-based coding techniques on first video blocks associated with the first video sequence;
    a deblocking filter used by the first codec as an in-loop filter to smooth transitions between adjacent video blocks in the first video sequence; and
    a second codec that codes second video sequences according to a second video coding standard using prediction-based coding techniques on second video blocks associated with the second video sequence,
    wherein the deblocking filter used by the first codec is used by the second codec as a post filter to smooth transitions between adjacent video blocks associated with the second video sequence, wherein the second codec receives a quantization parameter, generates an adjusted quantization parameter based on the received quantization parameter, determines a boundary strength, determines a filtering decision, and applies the in-loop deblocking filter as the post deblocking filter subject to the filtering decision based on the adjusted quantization parameter and the boundary strength, and wherein:

the received quantization parameter comprises a parameter defined by the second video coding standard; and the adjusted quantization parameter comprises a parameter defined by the first video coding standard, wherein generation of the adjusted quantization parameter by the second codec comprises mapping the parameter defined by the second video coding standard to the parameter defined by the first video coding standard.

2. The video coding device of claim 1, wherein the first video coding standard is different than the second video coding standard and the first video coding standard mandates in-loop deblock filtering and the second video coding standard uses post deblock filtering without mandating in-loop deblock filtering, and wherein the second codec maps a plurality of input parameters to the deblocking filter from the first video coding standard to the second video coding standard.

3. The video coding device of claim 1, wherein:

the prediction-based coding techniques used by the first codec include inter-frame prediction techniques; and the prediction-based coding techniques used by the second codec include inter-frame prediction techniques.

4. The video coding device of claim 3, wherein:

the inter-frame prediction techniques used by the first codec include motion estimation and motion compensation techniques; and the inter-frame prediction techniques used by the second codec include motion estimation and motion compensation techniques.

5. The video coding device of claim 1, wherein:

the prediction-based coding techniques used by the first codec include intra-frame prediction techniques; and the prediction-based coding techniques used by the second codec include intra-frame prediction techniques.

6. The video coding device of claim 1, wherein the first coding standard comprises an International Telecommunication Union Telecommunications (ITU-T) H.264 standard and the second coding standard comprises a Moving Picture Experts Group 4 (MPEG-4) standard.

7. The video coding device of claim 1, wherein mapping the parameter defined by the second video coding standard to the parameter defined by the first video coding standard comprises performing a table lookup.

8. The video coding device of claim 1, wherein the video coding device comprises at least one of a digital television, a wireless communication device, a personal digital assistant, a laptop computer, a desktop computer, a digital camera, a digital recording device, a cellular radiotelephone having video capabilities, and a satellite radiotelephone having video capabilities.

9. The video coding device of claim 1, wherein the first codec applies the deblocking filter as the in-loop filter during both encoding and decoding and the second codec applies the deblocking filter as the post filter following decoding.

10. The video coding device of claim 1, wherein the second codec includes:

means for receiving the quantization parameter;

means for generating the adjusted quantization parameter based on the received quantization parameter;

means for determining the boundary strength;

means for determining the filtering decision; and means for applying the filtering means as the post deblocking filter subject to the filtering decision based on the adjusted quantization parameter and the boundary strength.

11. A video coding method comprising:

coding first video sequences, by a first codec, according to a first video coding standard using prediction-based coding techniques on first video blocks associated with the first video sequence;

smoothing transitions between adjacent video blocks in the first video sequence, by a deblocking filter used by the first codec as an in-loop filter; and coding second video sequences, by a second codec, according to a second video coding standard using prediction-based coding techniques on second video blocks associated with the second video sequence, wherein the deblocking filter used by the first codec is used by the second codec as a post filter to smooth transitions between adjacent video blocks associated with the second video sequence, wherein the second codec receives a quantization parameter, generates an adjusted quantization parameter based on the received quantization parameter, determines a boundary strength, determines a filtering decision, and applies the in-loop deblocking filter as the post deblocking filter subject to the filtering decision based on the adjusted quantization parameter and the boundary strength, and wherein:

the received quantization parameter comprises a parameter defined by the second video coding standard; and the adjusted quantization parameter comprises a parameter defined by the first video coding standard, wherein generation of the adjusted quantization parameter by the second codec comprises mapping the parameter defined by the second video coding standard to the parameter defined by the first video coding standard.

12. The video coding method of claim 11, wherein mapping the parameter defined by the second video coding standard to the parameter defined by the first video coding standard comprises performing a table lookup.

13. The video coding method of claim 11, wherein the video coding device comprises at least one of a digital television, a wireless communication device, a personal digital assistant, a laptop computer, a desktop computer, a digital camera, a digital recording device, a cellular radiotelephone having video capabilities, and a satellite radiotelephone having video capabilities.

14. The video coding method of claim 11, wherein the first codec applies the deblocking filter as the in-loop filter during both encoding and decoding and the second codec applies the deblocking filter as the post filter following decoding.

15. The video coding method of claim 11, wherein the first video coding standard is different than the second video coding standard and the first video coding standard mandates in-loop deblock filtering and the second video coding standard uses post deblock filtering without mandating in-loop deblock filtering, and wherein the second codec maps a plurality of input parameters to the deblocking filter from the first video coding standard to the second video coding standard.

16. The video coding method of claim 11, wherein:
the prediction-based coding techniques used by the first codec include inter-frame prediction techniques; and
the prediction-based coding techniques used by the second codec include inter-frame prediction techniques.

17. The video coding method of claim 16, wherein:
the inter-frame prediction techniques used by the first codec include motion estimation and motion compensation techniques; and
the inter-frame prediction techniques used by the second codec include motion estimation and motion compensation techniques.

18. The video coding method of claim 11, wherein:
the prediction-based coding techniques used by the first codec include intra-frame prediction techniques; and
the prediction-based coding techniques used by the second codec include intra-frame prediction techniques.

19. The video coding method of claim 11, wherein the first coding standard comprises an International Telecommunication Union Telecommunications (ITU-T) H.264 standard and the second coding standard comprises a Moving Picture Experts Group 4 (MPEG-4) standard.

20. A non-transitory computer readable medium comprising instructions that when executed in a video coding device that includes a first codec and a second codec causes the video coding device to:
code first video sequences, by the first codec, according to a first video coding standard using prediction-based coding techniques on first video blocks associated with the first video sequence;
smooth transitions between adjacent video blocks in the first video sequence, by a deblocking filter used by the first codec as an in-loop filter; and
code second video sequences, by the second codec, according to a second video coding standard using prediction-based coding techniques on second video blocks associated with the second video sequence,
wherein the deblocking filter used by the first codec is used by the second codec as a post filter to smooth transitions between adjacent video blocks associated with the second video sequence,
wherein the second codec receives a quantization parameter, generates an adjusted quantization parameter based on the received quantization parameter, determines a boundary strength, determines a filtering decision, and applies the in-loop deblocking filter as the post deblocking filter subject to the filtering decision based on the adjusted quantization parameter and the boundary strength, and
wherein:
the received quantization parameter comprises a parameter defined by the second video coding standard; and
the adjusted quantization parameter comprises a parameter defined by the first video coding standard, wherein generation of the adjusted quantization parameter by the second codec comprises mapping the parameter defined by the second video coding standard to the parameter defined by the first video coding standard.

21. The computer readable medium of claim 20, wherein the instructions that cause the video coding device to map the parameter defined by the second video coding standard to the parameter defined by the first video coding standard comprise instructions that cause the video coding device to perform a table lookup.

22. The computer readable medium of claim 20, wherein the video coding device comprises at least one of a digital television, a wireless communication device, a personal digital assistant, a laptop computer, a desktop computer, a digital camera, a digital recording device, a cellular radiotelephone having video capabilities, and a satellite radiotelephone having video capabilities.

23. The computer readable medium of claim 20, wherein the first codec applies the deblocking filter as the in-loop filter during both encoding and decoding and the second codec applies the deblocking filter as the post filter following decoding.

24. The computer readable medium of claim 20, wherein the first video coding standard is different than the second video coding standard and the first video coding standard mandates in-loop deblock filtering and the second video coding standard uses post deblock filtering without mandating in-loop deblock filtering, and wherein the second codec maps a plurality of input parameters to the deblocking filter from the first video coding standard to the second video coding standard.

25. The computer readable medium of claim 20, wherein:
the prediction-based coding techniques used by the first codec include inter-frame prediction techniques; and
the prediction-based coding techniques used by the second codec include inter-frame prediction techniques.

26. The computer readable medium of claim 25, wherein:
the inter-frame prediction techniques used by the first codec include motion estimation and motion compensation techniques; and
the inter-frame prediction techniques used by the second codec include motion estimation and motion compensation techniques.

27. The computer readable medium of claim 20, wherein:
the prediction-based coding techniques used by the first codec include intra-frame prediction techniques; and
the prediction-based coding techniques used by the second codec include intra-frame prediction techniques.

28. The computer readable medium of claim 20, wherein the first coding standard comprises an International Telecommunication Union Telecommunications (ITU-T) H.264 standard and the second coding standard comprises a Moving Picture Experts Group 4 (MPEG-4) standard.

* * * * *